United States Patent [19]

Runnels

[11] Patent Number: 4,527,158
[45] Date of Patent: Jul. 2, 1985

[54] AIRCRAFT COLLISION PILOT WARNING INDICATING SYSTEM

[76] Inventor: Russell W. Runnels, 528 Greene Rd., Martinsville, Ohio 45146

[21] Appl. No.: 403,165

[22] Filed: Jul. 29, 1982

[51] Int. Cl.³ .............................................. G08G 5/00
[52] U.S. Cl. .................................. 340/961; 340/981; 356/152
[58] Field of Search .............. 340/942, 961, 963, 981; 356/4, 141, 152; 250/214 B; 307/356, 358

[56] References Cited

U.S. PATENT DOCUMENTS

| | | | |
|---|---|---|---|
| 3,551,676 | 12/1970 | Runnels | 340/981 |
| 3,620,626 | 11/1971 | Daly | 340/961 |
| 3,652,981 | 3/1972 | Campanella | 340/961 |
| 3,699,511 | 10/1972 | Fletcher | 340/961 |
| 3,736,559 | 5/1973 | Trageser | 340/961 |
| 3,846,746 | 11/1974 | Trageser | 340/961 |
| 4,277,170 | 7/1981 | Miles | 340/961 |
| 4,309,618 | 1/1982 | Carter | 356/4 |
| 4,398,172 | 8/1983 | Carroll | 340/942 |

Primary Examiner—John W. Caldwell, Sr.
Assistant Examiner—Michael F. Heim
Attorney, Agent, or Firm—Biebel, French & Nauman

[57] ABSTRACT

A host platform having an azimuthal system based on a determined heading, has a plurality of light detectors, each arranged to receive light from a respective predetermined sector in the said azimuthal system. An electronic amplification and signal processing channel is associated with each detector whereby detection response is primarily responsive to alien warning light radiation signals. Gating circuits inhibit all channel responses during the flash of any host warning strobe flashers and also inhibit the response of any channel in which the particular detector of that channel receives direct sunlight. The detection of an alien warning light signal initiates an alarm indicating the corresponding sector receiving the warning radiation.

3 Claims, 15 Drawing Figures

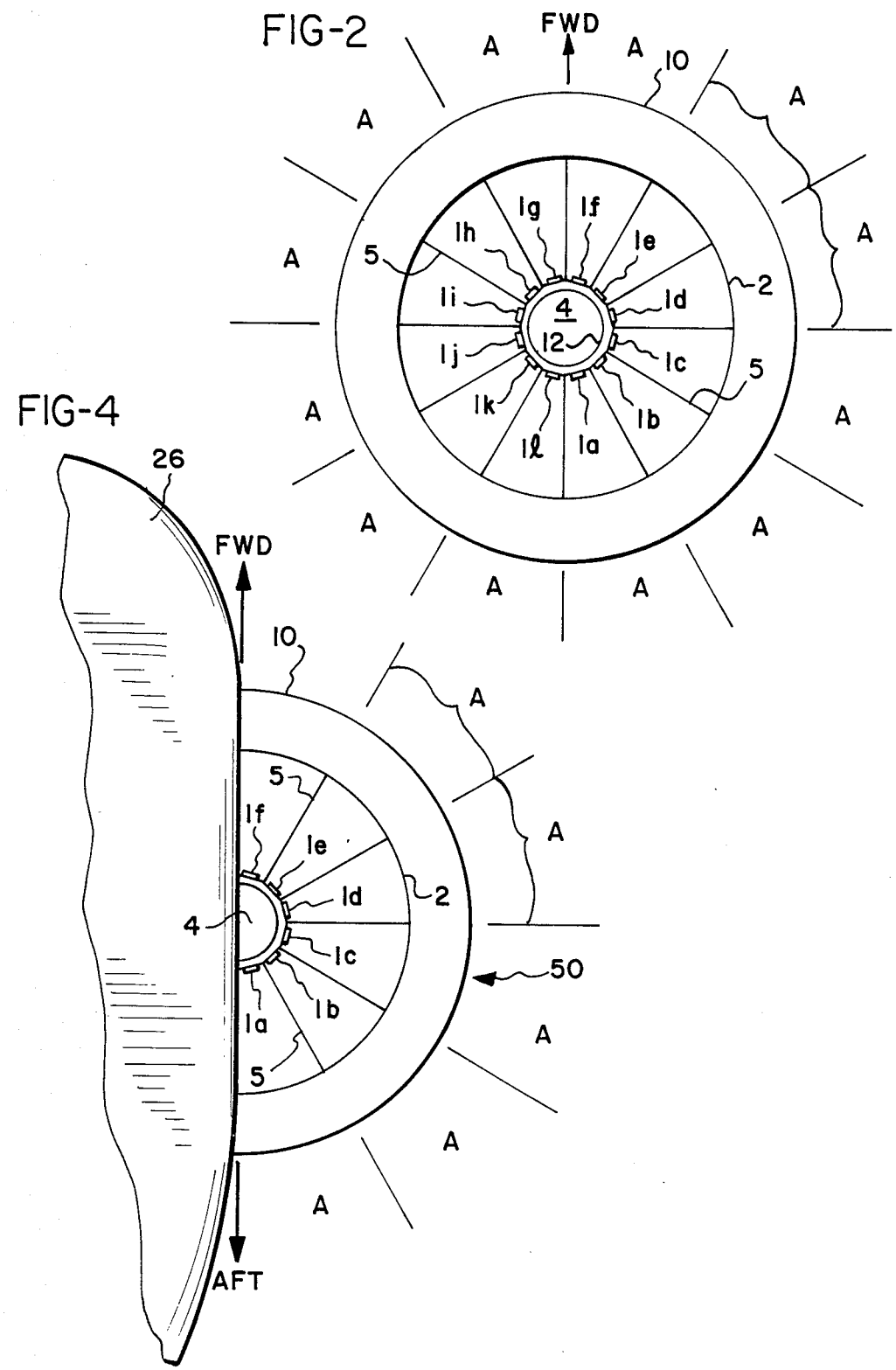

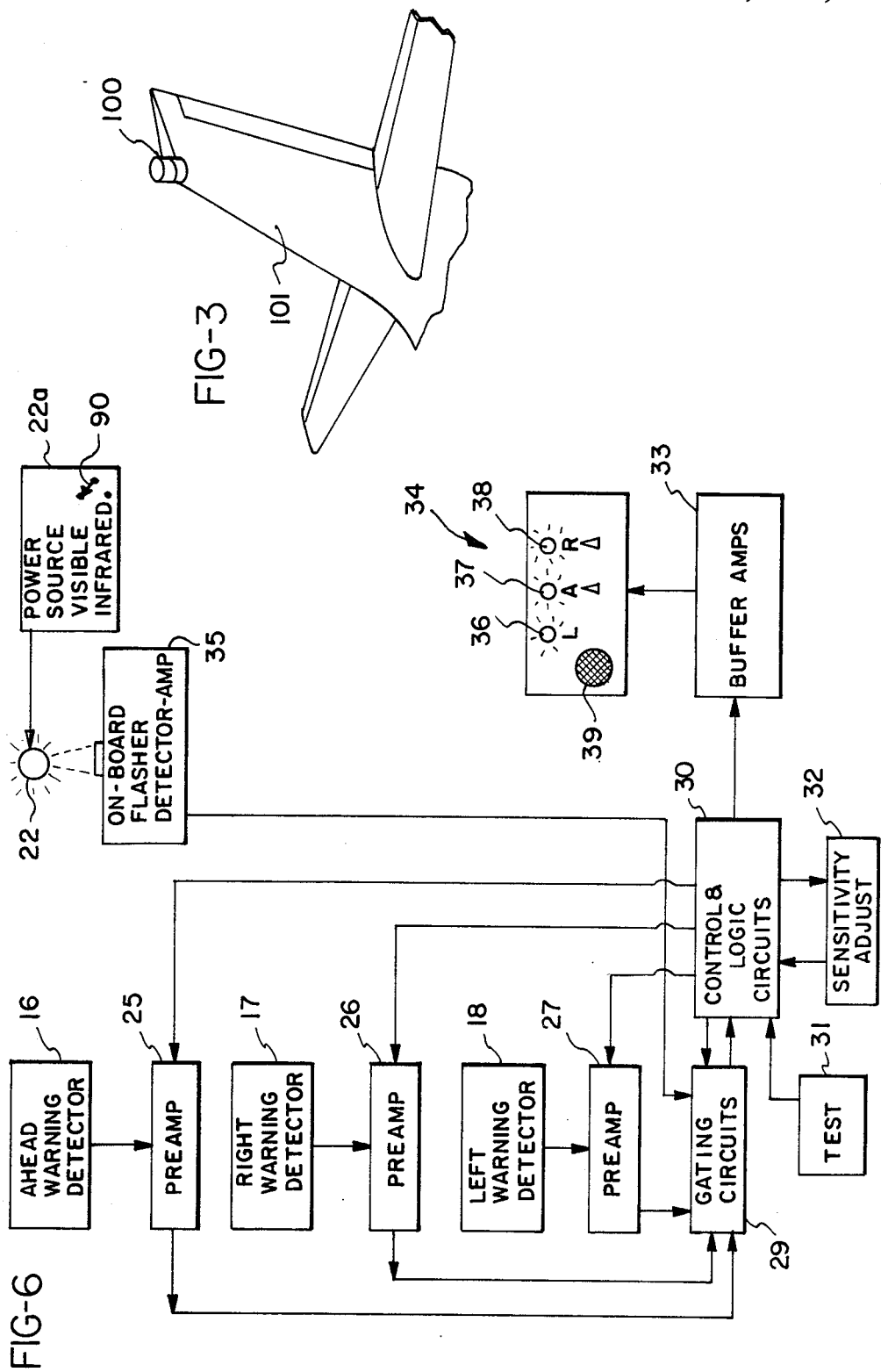

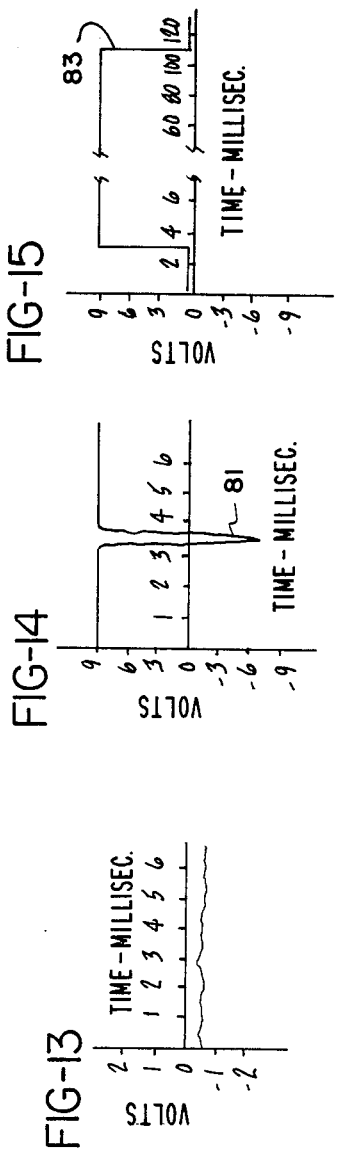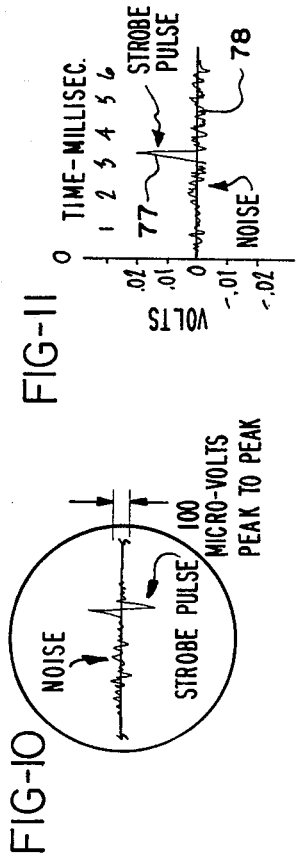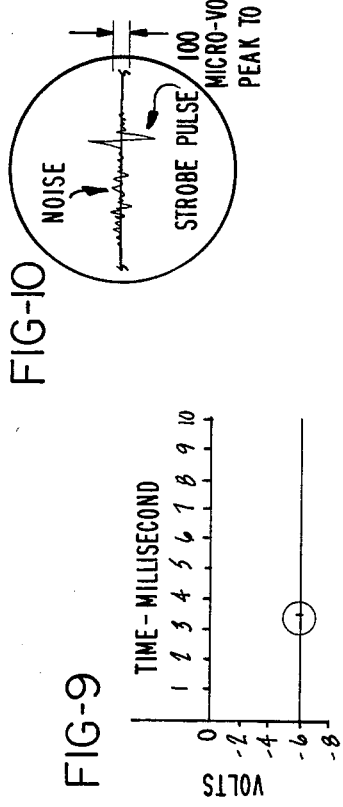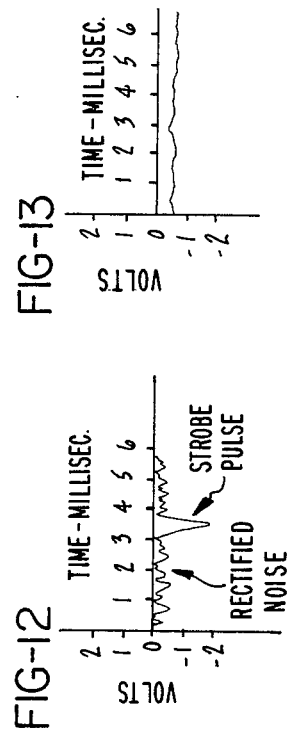

AIRCRAFT COLLISION PILOT WARNING INDICATING SYSTEM

BACKGROUND OF THE INVENTION

The field of the invention is in the art of aircraft collision warning systems, and more particularly that of an aircraft warning system that is mounted on aircraft and which has panoramic viewing for detecting light radiation emitted by other aircraft and objects, thereby indicating their presence.

The growing number of commercial and private aircraft using the air space has significantly increased the danger of midair collisions and has emphasized the need for an efficient, low cost aircraft warning system capable of alerting the pilot of an aircraft to the presence of nearby aircraft.

Warning systems in the prior art typically have included a transmitter and a receiver operating in the visible and/or infrared spectrum and operating together in a so-called "non-cooperative" system in which a pilot warning indication is given only when the receiver detects the radiation corresponding to the emitted radiation by its associated transmitters. Hence, a nearby aircraft from which a signal is not reflected adequately will pass undetected.

Furthermore, previously known aircraft warning systems have generally employed rotating radiation scanners driven by electric motors which generate electrical noise and interfere with aircraft communication and navigation equipment. The motor and its associated gearing are also apt to break down, and when the scanning mechanism fails, the entire warning system fails.

The present invention provides a self-contained aircraft warning system which operates in a passive and "semi-cooperative" manner to detect light radiations (ultra violet, visible or infrared) emitted by other nearby aircraft. Other warning beacons, such as those on antenna towers, will also activate the warning signal. It does not rely upon the detection of light emitted from its own beacon as reflected from another aircraft. It does require other aircraft to be equipped with a strobe beacon or rotating beacon warning system. The warning system disclosed herein is simple in design and requires no moving parts which might break down or interfere with other aircraft systems. U.S. Pat. No. 3,551,676 to patentee Runnels discloses a prior art passive system having panoramic viewing reflectors.

Typically, a multiplicity of detectors is provided for the panoramic viewing in a full 360° circle of azimuth about a central axis. Each detector views a sector of the 360° circle of azimuth. The number of detectors employed is based on the number of degrees of azimuth desired to be covered, and as dictated by the particular model of embodiment. The greater the number, the greater the discrimination in azimuth; also, the greater the complexity and cost. A means of optically masking the azimuth area of coverage, depending upon the model of embodiment, is also provided. This enables embodiments of the invention to be mounted in places where shielding from local radiation is required. Electrical means connected to the radiation detector, or detectors, give the pilot of the aircraft on which the apparatus is mounted, a warning when such radiation is received. Panoramic viewing with the multiplicity of detectors permits continuous viewing completely about the horizontal plane so that no mechanical scanning apparatus is required. Moreover, the particular arrangement of detectors taught herein is well adapted to the production of a wide range of aircraft warning indicators with panoramic fields of view having various angles of view above and below the horizontal plane. This last feature is particularly advantageous since the aircraft warning sensor will frequently be mounted in different positions and locations on different types of aircraft. Thus, the placement of a aircraft warning sensor, at the top of the vertical tail structure, would have an optical viewing pattern different from a warning sensor located under the aircraft's fuselage. Furthermore, the invention teaches the construction of a panoramic viewing structure that can advantageously be located at the outer extremities at each wing tip of the host aircraft, permitting a totally unobstructed panoramic view of 360° of azimuth about the vertical axis in the horizontal plane of the host aircraft.

The use of more than one radiation detector in a given amount of bearing sector will provide an indication of the relative bearing of a detected aircraft within the sector. For example, four radiation detectors, each covering 90°, provide for the indication of the particular quandrant in the 360° span relative to the aircraft heading in which the detected aircraft is located. The number of radiation detectors employed is a function of the desired number of areas in which detection is desired in a particular system embodiment. For example, 36 detectors will give an indication of each 10° sector of arc relative to the aircraft's heading in which the detected aircraft is located.

Although the aircraft warning system of the present invention is primarily a receiver of radiation, one or more radiation sources can be advantageously combined integrally with the panoramic viewing structure when further means are provided for inhibiting the electrical alarm from responding to radiation emitted directly from such a source. In this arrangement, both radiation receiver and beacon are conveniently combined in one unit. However, it should be remembered that the present warning system is basically passive and does not rely upon the reception of radiation originating from the aircraft's own beacon. Indeed, special provisions are made to prevent the indicator from responding directly to radiation emitted by the aircraft's own rotating beacons or strobe systems.

SUMMARY OF THE INVENTION

The aircraft warning system of the present invention has means for panoramic viewing of a continuous 360° circle of azimuth through the use of a multiplicity of detectors. The detectors are adapted to be mounted on an aircraft about a central axis, each viewing a specific sector of azimuth. The number of detectors used is dependent upon the number of degrees per sector of azimuth that each system embodiment uses. Electrical alarm indicator means are connected to each detector to indicate the reception of beacon radiation by that detector.

In one preferred configuration the warning system employs three detectors, each viewing 120° of azimuth for light radiation. Means are provided for optically shielding of each detector in such a manner that only 120° azimuth of radiation is sensed by each detector. Using three detectors, typically the warning system is oriented on the aircraft, such that when considering the numbers on a clock face and considering that the aircraft's nose is directed at the 12 o'clock position, and looking downward at the aircraft, the forward facing detector senses the area from 10 o'clock to the 2 o'clock position. A second detector senses the azimuth area from the 2 o'clock position to the 6 o'clock position. The third detector senses the azimuth area between the 6 o'clock position to the 10 o'clock position. In this manner, 360° azimuth of radiation is covered by the warning system.

In another preferred configuration, providing greater angular discrimination, 12 detectors are arranged in a manner that each detector senses through a span of 30° in azimuth. Referring again to the numbering arrangement on a clock face, the first detector senses the span in azimuth between the 12 o'clock and the 1 o'clock position. The second detector senses the span between the 1 o'clock position and the 2 o'clock, and henceforth on around the horizontal plane until 360° of azimuth have been detected. Electrical alarm indicator means are connected to the detectors to indicate the reception of beacon radiation by each detector.

Inhibiting means are provided in the form of optical shielding whereby each detector senses only in the desired sector of azimuth radiation detection. The inhibiting means is typically conventional non-reflecting opaque elements positioned between detectors whereby radiation from a beacon source is prevented from falling on more than two detectors at one time.

It is therefore an object of the invention to provide a reliable, compact, and economical collision warning system for aircraft.

It is another object of the invention to provide an indication to the pilot of an aircraft, the presence and direction of any flashing warning lights.

It is another object of the invention to provide a passive detection system in which bright sunlight inhibits detector channels only while their viewing sector is directed at the sun.

It is another object of the invention to provide a warning detection system that is primarily responsive to the characteristics of warning light flashers.

It is still another object of the invention to provide a combined unitary warning and warning detection system for aircraft.

Other objects and advantages of the invention will be apparent from the following description, the accompanying drawings and the appended claims.

BRIEF DESCRIPTION OF THE DRAWINGS

FIG. 2 is a schematic view perpendicular to the center line of the elevational view of FIG. 1, showing an arrangement of twelve detectors for 360° azimuth viewing;

FIG. 3 is a pictorial schematic illustration of an embodiment of the invention mounted on an aircraft vertical fin;

FIG. 4 is a schematic view perpendicular to an aircraft wing surface showing a typical arrangement of six detectors in the described structure for panoramic viewing from the starboard size of the aircraft;

FIG. 6 is a simplified block diagram of an electrical alarm indicator system in accordance with the present invention;

FIG. 9 illustrates a typical output signal from the detector-transimpedence amplifier in bright daylight sky background with a warning strobe pulse at approximately 3.7 milliseconds;

FIG. 10 illustrates an expansion of the scale in the range from 3-4 milliseconds of FIG. 9;

FIG. 11 illustrates the same signal at the output of the bandpass amplifier;

FIG. 12 illustrates the same signal at the threshold adjust resistor;

FIG. 13 illustrates the noise averaged signal at the input to the comparator;

FIG. 14 illustrates the output signal of the comparator, having the input signals of FIGS. 12 and 13; and FIG. 15 illustrates the output signal from the monostable pulse generator.

DETAILED DESCRIPTION OF PREFERRED EMBODIMENT

Figure 1:
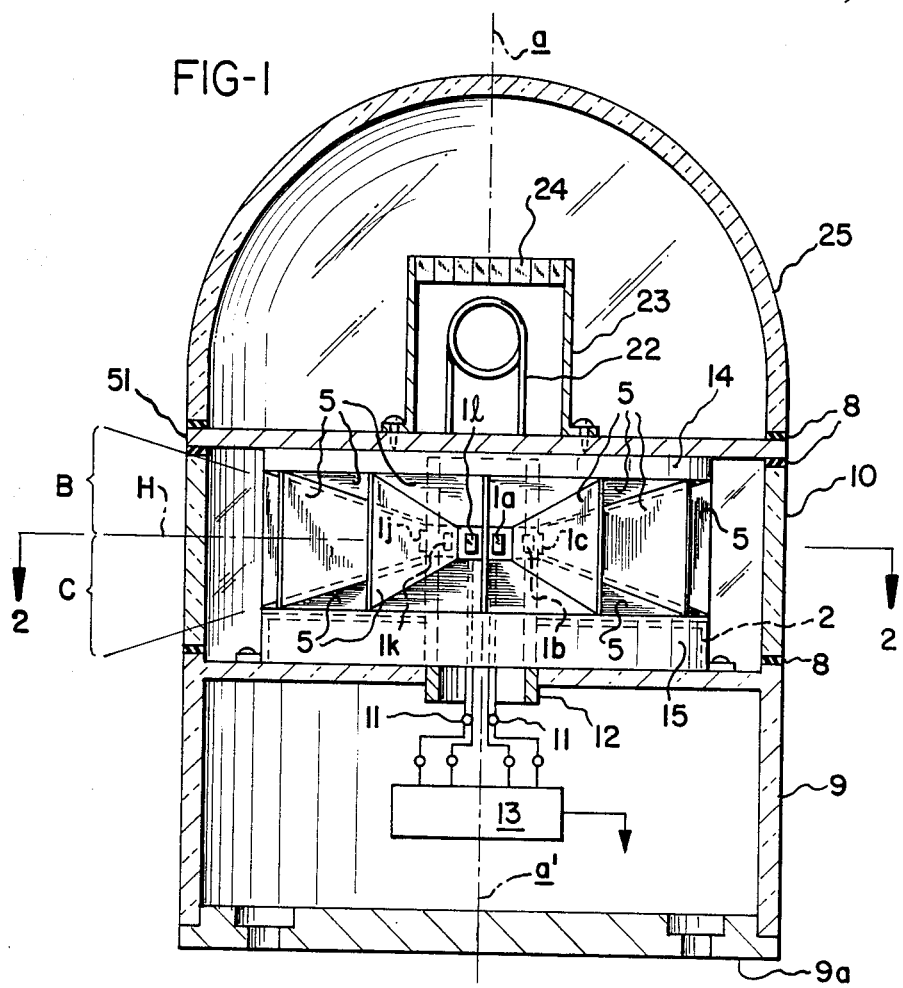
FIG. 1 is a schematic elevational view in partial section of an embodiment of an aircraft warning and detection apparatus in accordance with the present invention.

A typical embodiment of an aircraft warning and detection apparatus in accordance with the present invention is shown schematically in FIG. 1. It comprises a twelve element, with each element spanning a 30° sector, detector system combined with a visible flasher 22 and an infrared flasher 24. A circular metal base 9, is conventionally adapted to be mounted on an aircraft, such as by bolting through base plate 9a to an airframe member. This base supports and is attached to a cylindrical transparent window element 10. The window element 10 may advantageously have an optical filter coating which permits the element to pass only radiation within a desired spectral range. The optical shielding structure 5 is mounted on support bracket 2, mounted on the base 9. All elements of the structure supporting and housing the detectors and electronic circuitry may be conventionally formed of molded plastics.

The radiation detectors 1a through 1l are mounted near the end of a cylindrical hollow support shaft 12, each facing outwardly so as to receive any radiation in their viewing sector emitted by a nearby aircraft or other warning flasher. Electrical leads 11 from each detector pass through the hollow shaft 12 for connection to electronic circuits 13 for detector amplification, signal processing, and indicator display. In simplified form, the indicator means is merely a light on the aircraft's control panel which is turned on when its associated detector receives radiation above a predetermined threshold value.

The detectors, as illustrated 1a through 1l in FIG. 1, may be any one of several commercially available photodiodes (such as type UV-250B), phototransistors, photodiode amplifiers or other photo-senstive devices optically responsive to the spectral emission of presently used aircraft anti-collision lights, whether such lights are rotating red or white beacons or flashing red or white strobe lights. A broad spectrum sensor such as type UV-250B, manufactured by EG&G, can be employed to detect not only the anti-collision lights mentioned, but also elemental or compound semiconductor lasers or light emitters. An example of an elemental semiconductor would be one made of silicon, and an example of a compound semiconductor would be Galium Arsenide and related compounds.

The optically shielding structures 5 as illustrated in FIGS. 1 and 2 provide for panoramic viewing around the center line axis a, a'. Light energy transmitted from other aircraft, for example, which is within the azimuth sector angle of view of an individual detection area falls upon that particular detector. The horizontal angle of view for the panoramic viewing area illustrated in FIG. 2 uses twelve individual sector detectors 1a through 1l located around the axis a a' in approximately 30° per sector. The angle of radiation detection, A, is established by the number of detectors used in any particular embodiment. This number of detectors "x" for 360° panoramic viewing is determined by the formula: "x"=360/A where A is desired span angle of each detector. For example, if 45° is the desired span angle of radiation detection, then the number of detectors required is eight.

The optical shielding arrangement shown in FIG. 1 establishes the panoramic viewing area above and below the horizontal plane "H". As shown in FIG. 1, the angle B above the horizontal plane H is conventionally established as required, depending upon the viewing area desired in any particular embodiment. The same is true for the panoramic viewing area below the horizontal plane. As shown in FIG. 1, the angle C below the horizontal plane H is established as required, depending upon the viewing area desired in any particular embodiment. In general, the angles B and C are typically on the order of 15° each, establishing a vertical field of view of approximately 30°.

Exact dimensions of the physical elements which establish the panoramic viewing structure and the specific angles associated with each sector shown in FIGS. 1 and 2 are not given since it will be understood that such dimensions and angles are not critical to the overall operation of the present invention. It will be perceived, however, that variations in the number of detectors desired, defining the sectors of azimuth to be detected and the angles of viewing, A, B, and C, will establish the areas about the horizontal plane and the vertical axis for the detection of light emitted by an alien aircraft. This flexibility in optical characteristics is particularly valuable in this aircraft warning system since the panoramic viewing area can be derived by mounting the sensing structure at different positions on different aircraft and each location has its own optimal viewing aspects. FIG. 3 illustrates a typical suitable location for a single housing of detectors 100 on the top of the leading edge of the vertical fin 101 of an aircraft. A dual installation with one housing of detectors located substantially centrally on the top of the fuselage with another housing of detectors located substantially centrally on the bottom of the fuselage may also typically be employed. Additionally, a multiplicity of sensing structures can be mounted on the same aircraft at different locations, each having its own optimal viewing aspects.

FIG. 4 illustrates another embodiment in which a panoramic viewing structure is positioned on the host aircraft at the outer extremities of each wing tip (only the right wing tip is shown in the drawing). Right wing tip 26 has conventionally attached panoramic viewing structure 50 holding six radiation detectors, 1a, 1b, 1c, 1d 1e, and 1f located along the horizontal plane and each optically shielded from another, each viewing a 30° sector of the horizontal plane. The use of six detectors will provide a total panoramic viewing area of 180°, thus a panoramic view along the horizontal plane, from directly forward and parallel to the aircraft centerline to directly aft, and on the starboard side of the aircraft will be sensed. It is taught herein that the structure described will also perform panoramic viewing of a desired predetermined angle above and below the horizontal plane. A substantially identical structure (reverse) is located on the left wing tip to provide total panoramic viewing of 180° on the port side of the aircraft, also from directly forward to directly aft and parallel to the aircraft centerline. Thus, 360° of panoramic viewing about the horizontal plane will be accomplished through the use of said detecting structures located on both wing tips. Therefore, it can be seen that the use of radiation detecting structure such as illustrated will provide housing for a multiplicity of detectors, each viewing a predescribed segment of viewing area and each completely free of obstructions from the host aircraft.

Figure 5:
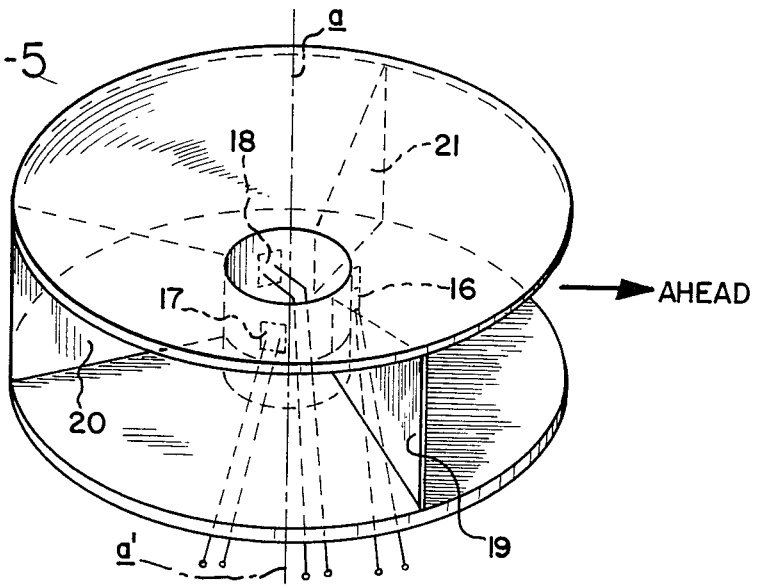
FIG. 5 is a schematic perspective view showing the arrangement of three detectors for 360° azimuth viewing.

An embodiment comprising an array of three radiation detectors 16, 17, and 18 positioned around a central axis a, a' is shown schematically in FIG. 5. The use of three radiation detectors arranged in a horizontal plane permits identification of the particular panoramic viewing area relative to the heading of the aircraft in which a detected aircraft is located. Similarly, 36 radiation detectors arranged around the vertical axis a, a', will result in an aircraft warning system with the ability to pinpoint the azimuth of a detected aircraft to one of thirty-six 10° sectors about the vertical axis. Opaque masking means such as the three intersecting opaque planes 19, 20 and 21 (as shown in FIG. 5) is desired to limit the radiation received by each of the detectors 16–18 to a predetermined angle about the vertical axis a, a'.

The aircraft warning sensor arrangement previously described may typically be combined with one or more aircraft beacons in an integral package. Returning to FIG. 1, surmounting the segmented detector housing there is a metal support plate 51 on which is mounted a conventional Xenon strobe lamp 22 and a bracket 23 supporting a circular array of compound semi-conductor light emitting diodes, or laser diodes, 24. The conventional transparent hemispherical dome 25 rests on a opaque light shielding gasket 8 and is conventionally attached to the supporting metal base 51 to enclose and optically isolate the detectors from the two radiation sources 22 and 24. In actual practice, either one of the radiation sources, or both, may be omitted or located elsewhere depending upon the embodiment desired.

The Xenon strobe lamp 22 when conventionally energized with an appropriate power source produces a visible light output in addition to spectral energy in the infrared. When properly energized, the light emitting diodes or lasers diodes 24 emit infrared light energy. This energy is radiated omni-directionally about the a, a' axis due to the use of the discrete diodes each having a radial beam spread of several degrees. The light emitting diodes or the laser diodes 24 can be any one of several commercially available devices, energized from a conventional power source.

At present, the use of visible rotating beacons or strobe lights is discouraged or prohibited in aircraft flying under poor visibility conditions, since the repetitious flashing light reflected from clouds tend to distract the pilot. The use of gallium arsenide or similar compound semiconductor diodes as a beacon source solves this problem because the infrared radiation emitted by such a source is not visible to the human eye, but it can be sensed by an uncooled conventional silicon radiation detector. A conventional switch 90 (FIG. 6) activated by the pilot energizes either the visible or the infrared flasher.

A simplified block schematic diagram of a typical electrical indicator system in accordance with the present invention is conceptually illustrated in FIG. 6. The indicator arrangment shown there envisions the use of the integral beacon-sensor configuration shown in FIG. 1, but having a multiplicity of detectors, such as the three detectors shown in FIG. 5. Each of the detectors 16–18 is electrically connected to its corresponding preamplifiers 25–27, respectively.

Preamplifiers 25–27 amplify the signal received from the detectors 16–18 and also filter out slowly changing signals so that only signals having fast rise and fast fall times are amplified. This filtering operation tends to eliminate all light signals not generated by the flashing beacons of other aircraft. The filtered and amplified outputs of circuits 25–27 are connected to sampling and gating circuits 29.

The host aircraft onboard strobe flasher 22, for warning other aircraft, is pulsed from a conventional power source 22a which periodically triggers or energizes the Xenon strobe lamp or the infrared radiator at a flashing rate of typically 50 to 150 times per minute. The onboard flasher-detector-amplifier circuit 35 generates a gating signal during the time that the host lamp 22 is emitting radiation. This gating signal is connected to further gating circuits 29.

The gating circuits 29 pass each of the three signals from the preamplifiers 25–27 except when the gating signal from detector-amplifier 35 is present. The gated light signals are transmitted to control and logic circuits 30 which performs several electrical functions of signal control including threshold and sensitivity control. Manual override of system sensitivity 32 is provided in the event that the pilot desires to control sensitivity on a momentary basis. Test circuits 31 are provided for system tests at any time. The three signals are then further amplified by buffer amplifiers 33 and delivered to the display panel 34.

The display panel 34 is located on the control panel of the aircraft and in this particular embodiment being described consists of three lamps 36–38 arranged in any convenient manner so as to denote the three areas of panoramic viewing relative to the heading of the aircraft. The lighting of a lamp on the display indicates reception of a light signal from an alien aircraft by the radiation detector sensing that particular panoramic sector. This correlation of a particular indicator with a particular sector span provides a directional indication of an alien flasher. Additional warning displays such as buzzers, horns or audible warning sounds 39, in addition to flashing lights, can also be provided on the display panel.

A system test circuit 31 is provided to generate one or more signals simulating the reception of a light signal from any or all of the detectors in order to test the system operation and display panel 34.

When one or more aircraft beacons are integrally mounted with a sensing structure of the present invention, or when otherwise positioned so as to be detected, an inhibiting means is required for preventing the system's indicators from attempting to respond to light emitted by the aircraft's own beacon. In addition to the previously mentioned opaque structure inhibiting means, additional means provided by the flasher-detector-amplifier circuit 35 and the gating circuit 29 as shown in FIG. 6 also serve to prevent the pilot's warning display from falsely indicating a warning by the reception of light emitted by the aircraft's own beacon or beacons. Typically, the onboard flasher detector 35 is another photodiode such as used to detect warning flashes from other aircraft (i.e., a UV 250B is a suitable detector). The detector 35 for sensing the onboard strobe may be conveniently located anyplace on the host aircraft that is visually illuminated from its own strobe. Alternatively, instead of using an optical detector (which is generally more convenient), an electrical signal from the power source 22a which activates flasher 22 may be directly used in controlling gating circuits 29.

Figure 7:
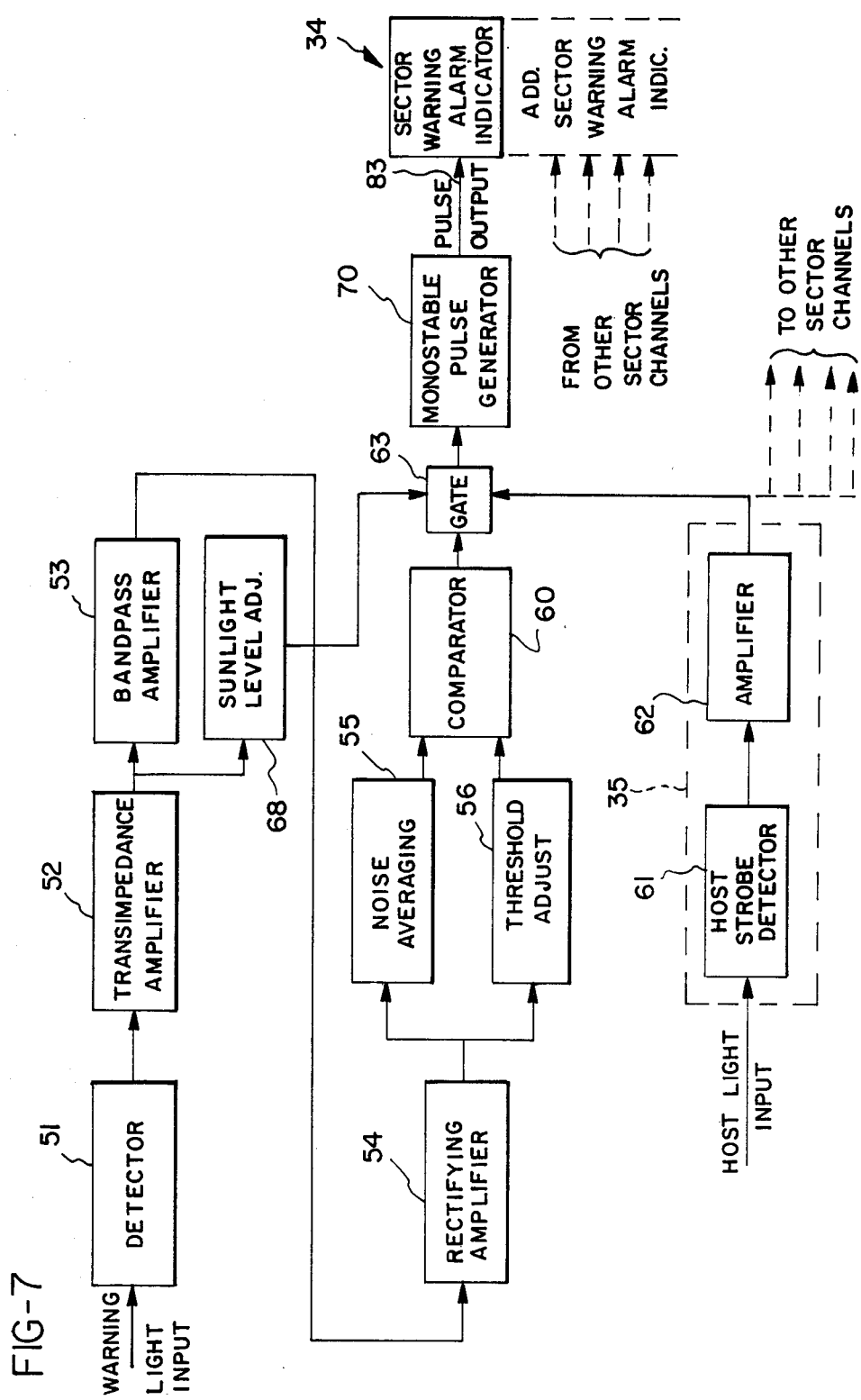
FIG. 7 is a detail block diagram of an embodiment of a typical electronic circuit of the invention.
Figure 8:
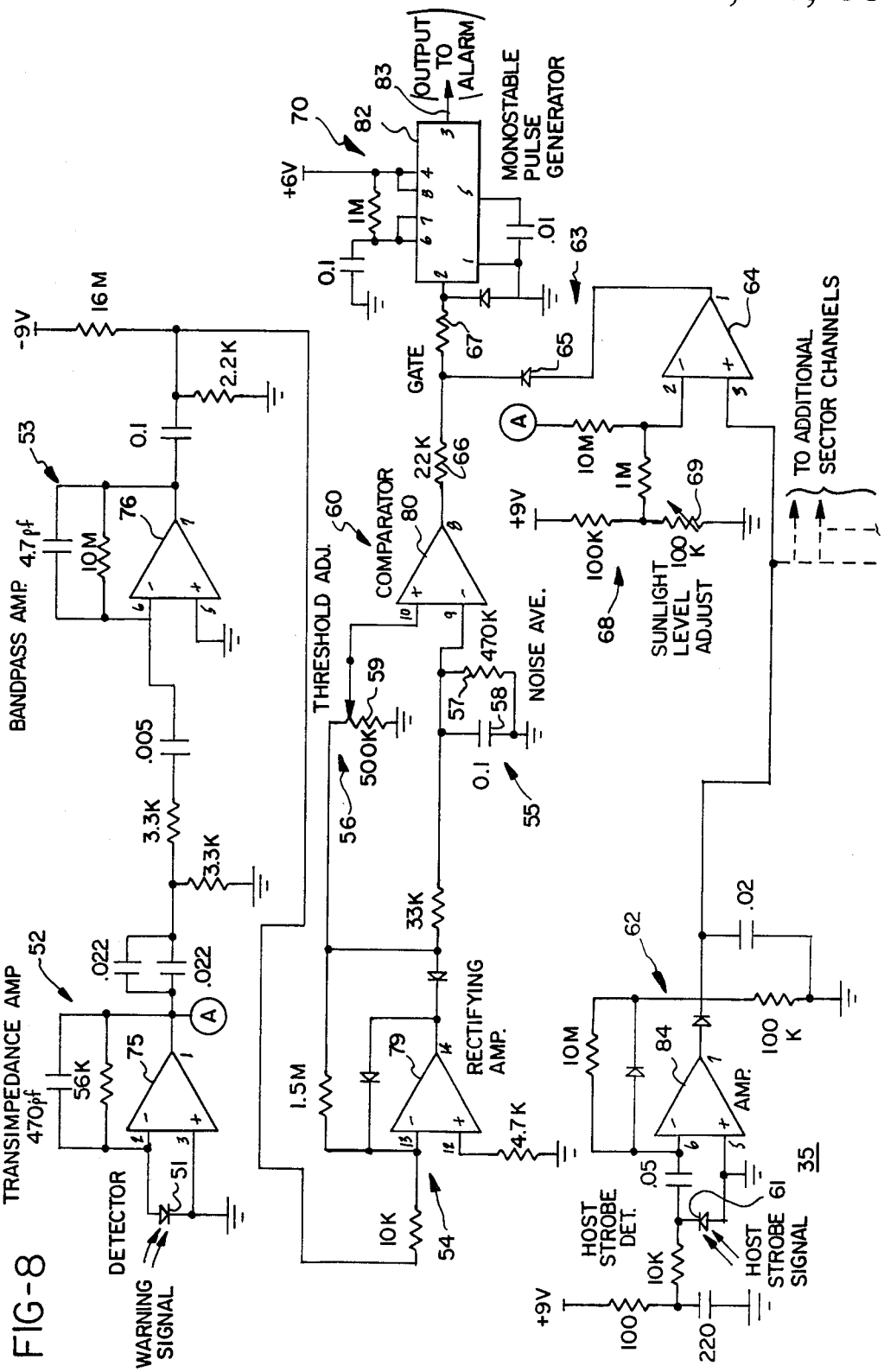
FIG. 8 is a typical detail schematic circuit diagram applicable to the block diagram of FIG. 7.

An embodiment of a typical electronic circuit associated with a sector detector channel is illustrated in detail block diagram form in FIG. 7. It is desirable that each sector detector channel have independent electronics with respect to other sector channels with the exception that a common onboard flasher detector and amplifier 35 may be used to gate all warning detection channels off while the host onboard flasher is activated. A typical electronic circuit embodiment schematic diagram is shown in detail in FIG. 8. FIG. 8 is labelled to correspond with block diagram of FIG. 7.

The following detailed explanation of the operation of the typical electronic circuits illustrated in FIGS. 7 and 8 is set forth to aid in the practicing of the invention.

A warning strobe signal, and unavoidable background light, are sensed as a light signal by detector 51. A light signal as received on detector 51 is composed of a steady, or direct current (DC) component, with a fluctuating, or noise, component superimposed. The noise componet is photon noise and is well known and described by conventional quantum theory. It has an amplitude proportional to the square root of the amplitude of the DC component wherein the amplitude referred to is the resulting current amplitude in the detector which is proportioned to the intensity of the received light, as well known in theory and experiment. The resulting electrical energy is first amplified by transimpedance amplifier 52. The resulting electrical signal is further amplified by the bandpass amplifier 53. This stage of amplification also serves the purpose of establishing a frequency bandpass designed to match the frequency content of typical strobe pulse waveforms. Typically, a bandpass characteristic of approximately 1 KHz to approxiately 3.4 KHz is suitable for use with conventional strobe flashers which typically have durations of approximately 100 to 400 microseconds. By thus utilizing the known predetermined characteristics of warning flashers the channel amplifiers are made primarily responsive to light radiated by them. The resulting signal is further amplified and also recitified by a rectifying amplifer 54. This amplifier produces a DC component proportional to the background light noise level, and also further amplifies the strobe signal. The resulting signal is furnished to two circuits: a noise averaging circuit 55 and a threshold adjust circuit 56. The noise averaging circuit, comprising resistor 57 and capacitor 58 (see FIG. 8), produces a DC threshold signal proportional to the peak background noise level averaged over a suitable time period, set by the product of resistor 57 and capacitor 58. The threshold adjust circuit, comprising potentiometer 59, provides an adjustable fraction of the total signal to the next stage. These two signals are input to the + and − differential inputs of comparator stage 60. The output of comparator stage 60 swings from positive to negative each time a strobe signal, sufficiently in excess of average background noise peaks, is received. Background noise invariably contains energy which will pass through the bandpass amplifier 53, and thus could cause a spurious output response. Put another way, the noise waveform at some instant over a sufficient duration of time, will contain a component which resembles a warning strobe light pulse in shape and duration. However, this noise component, although fluctuation by its very nature, has the property that it is relatively constant in energy content when averaged over a suitable time period, such as 100 to 1,000 times the time duration of a typical strobe pulse, as is done by the combination of resistor 57 and capacitor 58 illustrated in FIG. 8. (Specifically, the RC time constant, i.e., the response time of the circuit in seconds, where R is the resistance in ohms, and C is the capacitance in Farads, of resistor 57 and capacitor 58 in the noise-averaging circuit 55 is approximately 0.05 seconds ((nominally $0.1 \times 10^{-6} \times 0.47 \times 10^6$)), and the duration of conventional flashing strobe warning pulses are typically 0.0002 seconds duration.) The strobe pulses, by contrast, occur approximately once per second and are thus far from constant in energy when averaged in the same manner. The result of the circuit herein disclosed is to provide an automatically established threshold which is always maintained just high enough to exclude "warning light-like" noise pulses associated with slowly varying ambient light, and thereby to enable the triggering of the circuit by the smallest feasible signal resulting from an actual warning strobe light source.

The host strobe detector 61 is aimed so as to sense a strong signal from the strobe(s) of the host aircraft. This signal is amplified, by amplifer 62, and fed to gate circuit 63. Gate circuit 63, shown in detail in FIG. 8, comprises gating amplifier 64, diode 65 and buffering resistors 66 and 67. When a strong signal is received from the host strobe detector, it causes the gate circuit 63 to gate off any output of comparator stage 60, thus preventing the host aircraft's strobe signal (or any leakage or reflections therefrom), from being an output as a detected warning strobe pulse. The gate circuit 63 has an additional input from the transimpedance amplifier 52 (marked by a circled "A" in FIG. 8) which causes any output signal to be inhibited when a DC output magnitude from the transimpedance amplifier 52 exceeds a selected level, corresponding to direct exposure to sunlight. In the sunlight level adjust circuit 68, the appropriate level is manually adjusted by variable resistor 69 such that a signal from a detector having direct sunlight above a predetermined level falling on that detector will blank that channel so that no warning signal output will be provided from that detector while it is exposed to direct sunlight. This has been found to be desirable to prevent strong sunlight signals from overloading the system and producing false signals even though ideally, the sunlight signal, due to its characteristics, would tend not to be passed by bandpass amplifier 53. However, it has been found that with the electrical system overloaded and saturated by direct sunlight, sometimes noise riding on the saturated signal will provide false output signals. The gated comparator output signal is fed to a monostable pulse generator 70, which generates a well controlled pulse of a convenient duration and amplitude for triggering audio and/or visual alarm devices and circuitry 34.

As in the preceding detailed electric circuit, the following typical waveforms of a typical embodiment of the invention are illustrated merely as an aid to those practicing this invention, and in no way are they to be considered limiting to the invention.

FIG. 9 illustrates the output voltage characteristics at the output at pin 1 of operational amplifier 75 with the detector pointed in a bright daylight sky background with a warning strobe pulse, circled for recognition, being received at approximately 3.7 milliseconds on the time scale. It is to be remembered that the point on the time scale of reception of a warning light pulse has no connection whatsoever with range. The time scale is merely arbitrary. For measurement purposes during construction it is typically started after a cessation of the host's own strobe signal and runs to the onset of the next pulse of the host strobe. The time of occurrence of a warning light strobe pulse from another aircraft would be randomly independently determined by the degree of synchronism of the two strobe signals.

The situation illustrated in FIG. 9 is where the alien warning strobe received signal strength represents the situation where the received warning strobe signal level is near the minimum useable (i.e. from the maximum detectable range) for this particular embodiment with this particular strength of background signal.

The waveforms depicted in FIGS. 9 through 14 apply to a typical case in which the received strobe signal is only slightly greater in amplitude than the noise level associated with photon noise in the background, or ambient, light. This means the alien warning light was located near the maximum functional range for the particular embodiment being described and the illustrated existing conditions. Since, as is well known, the received alien warning light signal level will vary inversely as the square of the range to the alien light source, as the range of the alien light source decreases the amplitude of the received alien warning light signal grows in accordance with the inverse square law; it thus becomes correspondingly larger relative to the noise level. This poses no problem for the detection process.

FIG. 10 is an expanded scale drawing of the small region circled in FIG. 9. The horizontal scale is time ranging from 3 milliseconds (left end of scale), to 4 milliseconds. THe vertical scale is voltage as indicated by the 100 microvolt bars as labeled.

FIG. 11 illustrates the corresponding wave shape at the output pin 7 of operational amplifier 76 in the bandpass amplifier 53 (a bandpass amplifier is also frequently termed a filter amplifier). Note that the DC component of FIG. 9 has been removed and that the warning strobe pulse 77 is now clearly distinguished from the noise train 78.

FIG. 12 illustrates the signal from the operational amplifier 79 in the rectifying amplifier circuit 54 at the ungrounded end of resistor 59, i.e., the threshold adjust resistor, and FIG. 13 illustrates the signal at the ungrounded end of capacitor 58 and resistor 57, the noise averaging circuit. The function of these signals in the comparator operational amplifier 80 has been explained.

FIG. 14 illustrates the negatively going pulse signal 81 from pin 8 of operational amplifier 80 of the comparator 60.

FIG. 15 illustrates the output signal 83 from the integrated circuit 82 of the monostable pulse generator 70. This signal 83 may be used to directly activate a display signal or activate an audio alarm. If the desired display or sound generator requires more energy than that contained in the direct output of the monostable pulse generator, a conventional buffer amplifier may be driven by the monostable pulse generator that will furnish the required alarm activation power.

It is to be noted that the output signal 83 is typically of approximately 100 milliseconds duration. Thus, if at the next active period of detection time, the warning light signal is no longer present in this particular sector, the alarm for this section is extinguished.

A quad operational amplifier module type TL 084 is suitable for operational amplifiers 75, 76, 79, and 80. A type LF 353 dual operational amplifier module is suitable for operational amplifiers 64 and 84. A type 555 module is suitable for the monostable pulse generator 82. Type IN4148 diodes are suitable and a conventional power source of both plus and minus nine volts is a suitable power source for the operational amplifiers.

To further aid in the practicing of this invention, it is beneficial to observe the following features of the invention.

The use of multiple detector sectors, in addition to improving resolution of direction of an alien warning light flasher, also tends to improve detection sensitivity in that the ratio of sky return to that of a warning flasher is decreased, and the magnitude of inhibited reception angle due to direct sunlight is decreased.

The active time for alien warning flasher detection is that time between the flashes of the beacon or beacons, on the host aircraft. Thus if the host aircraft carries more than one beacon, it is desirable, but not mandatory, that they be synchronized.

The invention is not limited to initiating a warning to an aircraft operator that another aircraft in the vicinity, but as previously indicated, the warning flashers on antenna towers, smokestacks, tall buildings, and on other hazardous to aircraft structures will initiate the indicating alarm. Nor is the invention limited only to aircraft, but will function equally as well to provide an indication to a host, whether it be either a fixed platform or a movable platform, carrying the apparatus of the invention, of the presence and general direction from the host of a light warning signal in the vicinity.

Generally the host vehicle carrying the invention will have an operating warning flasher, however, this is not a requirement for the detection system to function and indicate the presence of warning lights exterior to the host vehicle.

In one typical operating embodiment of the invention, operating in bright skylight, reliable detection of conventional small plane warning flashers occurs at ranges of over one mile. It is to be understood that the actual detection ranges of various embodiments is a function of the particular photodetector used, the sector width of the detector, the intensity characteristics of the flasher, and the particular amount and characteristics of amplification and filtering employed in the embodiment.

While the forms of apparatus herein described constitute preferred embodiments of the invention, it is to be understood that the invention is not limited to these precise forms of apparatus, and that changes may be made therein without departing from the scope of the invention, which is defined in the appended claims.

What is claimed is:

1. A passive aircraft warning system for warning a host aircraft, having a heading in an azimuthal bearing system, of the presence of an object, comprising:
    (a) a conventional warning flashing light having the conventional characteristics of flashing at a substantially uniform rate of approximately 50 to 150 times per minute with substantially uniform flash durations of approximately 100 to 400 microseconds positioned on said object;
    (b) a plurality of light detectors each providing an independent electrical output responsive to their respective light input;
    (c) means for positioning on said host aircraft the said plurality of light detectors such that each detector is optically shielded to view a predetermined independent sector area in relation to said azimuthal heading and said plurality of detectors provide substantially 360° panoramic light detection;
    (d) a plurality of electronic amplification and control channels, in one-to-one correspondence with said plurality of light detectors, each amplifier and control channel primarily responsive to said warning light characteristics substantially providing an electrical output signal only when its associated detector detects light having said warning light characteristics, and
    wherein each of said electronic amplification and control channels includes a comparator, a noise-averaging circuit, and a threshold adjust circuit with said noise-average circuit and said threshold adjust circuit providing input signals of opposite polarity to said comparator whereby the said comparator provides an output signal of one polarity when a warning light is detected and an output signal of the opposite polarity from averaged pulses;
    (e) means for inhibiting the said input of any said channel when the associated said light detector of said channel receives direct sunlight with an intensity above a predetermined value;
    (f) means for providing a plurality of indicators in one-to-one correspondence with said plurality of electronic and control channels for providing a respective indication responsive to the said electrical output of a respective channel; and
    (g) means for correlating each of the said indicators with its associated detector viewing a respective section in azimuth whereby the direction of a detected warning light is indicated.

2. The warning system as claimed in claim 1 wherein the said noise-averaging circuit has a time constant of approximately 0.05 seconds.

3. The warning system as claimed in claim 2 wherein the said host aircraft has an onboard conventional warning flashing light and means cooperating with said onboard warning flashing light and with the said plurality of amplification and control channels for inhibiting the said outputs of the said amplification and control channels when said onboard warning flashing light flashes.

* * * * *